Patented Jan. 26, 1932

1,842,993

UNITED STATES PATENT OFFICE

KARL MARX AND HANS WESCHE, OF DESSAU IN ANHEIM, GERMANY, ASSIGNORS TO WINTHROP CHEMICAL COMPANY, INC., OF NEW YORK, N. Y., A CORPORATION OF NEW YORK

INSECTICIDE

No Drawing. Application filed July 5, 1928, Serial No. 290,696, and in Germany May 9, 1928.

This invention relates to improved insecticides and is based on the observation that the ethers derived from tetrahydronaphthol and the derivatives and substitution products of these ethers are extraordinarily active insecticides. Individual insecticides according to this invention are, for example, ar-$\alpha$-tetrahydronaphtholmethyl ether, ar-$\alpha$-tetrahydronaphtholethyl ether, ar-$\beta$-tetrahydronaphtholmethyl ether and ar-$\beta$-tetrahydronaphtholethyl ether. They may be used without being mixed with other insecticides or in admixture with synthetic or natural insecticides, for example pyrethrum, or with extracts of such natural insecticides, with diluents or with vehicles. They may be applied in any desired manner, as dusting powders or by spraying in form of a solution or emulsion. By addition of viscous oils, for example paraffine oil, the finely sprayed preparation remains for a long time suspended in the air.

The following examples illustrate the invention:

Example 1.—1-2 ccm. ar-$\beta$-tetrahydronaphtholmethyl ether are sprayed per 1 cbm. of a room infected by flies. That is sufficient to kill all the flies in a very short time.

Example 2.—5 parts of ar-$\alpha$-tetrahydronaphtholethyl ether are dissolved in 5 parts of butyl alcohol. 15 parts of an emulsifying agent are added, for instance a solution of 50 per cent. strength of the sodium salt of dibutylnaphthalene sulfonic acid. The mixture is then diluted to 100 parts with water. A solution of 2 per cent. strength of this stock preparation yields an excellent spraying agent.

What we claim is:

1. An insecticide containing as an active constituent an aliphatic ether of an ar-tetrahydro naphthol.

2. An insecticide containing as an active constituent ar-beta-tetrahydro naphthol methyl ether.

3. An insecticide containing as an active constituent ar-alpha-tetrahydro naphthol ethyl ether.

In testimony whereof, we affix our signatures.

KARL MARX.
HANS WESCHE.